United States Patent
Faure

(10) Patent No.: US 9,821,213 B2
(45) Date of Patent: Nov. 21, 2017

(54) PORTABLE OBJECT FOR REGATTAS

(71) Applicant: The Swatch Group Research and Development Ltd., Marin (CH)

(72) Inventor: Cedric Faure, Cortaillod (CH)

(73) Assignee: The Swatch Group Research and Development Ltd, Marin (CH)

( * ) Notice: Subject to any disclaimer, the term of this patent is extended or adjusted under 35 U.S.C. 154(b) by 109 days.

(21) Appl. No.: 14/874,689

(22) Filed: Oct. 5, 2015

(65) Prior Publication Data
US 2016/0101341 A1 Apr. 14, 2016

(30) Foreign Application Priority Data
Oct. 10, 2014 (EP) .................................... 14188458

(51) Int. Cl.
| | | |
|---|---|---|
| *A63B 71/06* | (2006.01) | |
| *B63B 49/00* | (2006.01) | |
| *G01C 21/20* | (2006.01) | |
| *G01C 21/10* | (2006.01) | |
| *B63J 99/00* | (2009.01) | |

(52) U.S. Cl.
CPC .......... *A63B 71/0686* (2013.01); *B63B 49/00* (2013.01); *G01C 21/10* (2013.01); *G01C 21/203* (2013.01); *B63J 2099/008* (2013.01)

(58) Field of Classification Search
CPC .. A63B 71/0656; A63B 49/00; G01C 21/203; G01C 21/10
USPC ....................................................... 701/400
See application file for complete search history.

(56) References Cited

U.S. PATENT DOCUMENTS

| | | | |
|---|---|---|---|
| 2010/0331145 A1 | 12/2010 | Lakovic et al. | |
| 2011/0003665 A1 | 1/2011 | Burton et al. | |
| 2011/0007468 A1 | 1/2011 | Burton et al. | |
| 2011/0032105 A1 | 2/2011 | Hoffman et al. | |
| 2013/0033598 A1* | 2/2013 | Milnes ................... | G01S 19/49 348/144 |
| 2013/0054138 A1* | 2/2013 | Clark ................... | G01C 21/203 701/468 |
| 2016/0091318 A1* | 3/2016 | Silfven ................... | B63B 49/00 701/439 |
| 2016/0370187 A1* | 12/2016 | Gatland ............... | G01C 21/203 |

FOREIGN PATENT DOCUMENTS

WO    WO 2010/126821 A1    11/2010

OTHER PUBLICATIONS

European Search Report dated Apr. 21, 2015 in European Application 14188458.5, filed on Oct. 10, 2014 (with English Translation).
RaceQ's.com "Starting Strategies Episode Two—The Full Speed Approach", Extracted from Internet: URL: http:/web.archive.org/web/20140826123803/http://raceqs.com/podcast/3-starting-strategies-episode-two-the-full-speed-aporoach/#. Aug. 26, 2014, 5 pages.

* cited by examiner

*Primary Examiner* — Yazan Soofi
(74) *Attorney, Agent, or Firm* — Oblon, McClelland, Maier & Neustadt, L.L.P.

(57) ABSTRACT

A race start assistance method for a boat participating in a regatta including a pre-race having a duration before the crossing of the start line, the method including a first step intended to permit the creation and storage of the start line in virtual form, and the determination of the instantaneous speed of the boat and its position with respect to the start line, in order to provide at least one indication on how to proceed in the pre-race.

26 Claims, 2 Drawing Sheets

PORTABLE OBJECT FOR REGATTAS

This application claims priority from European Patent Application No.14188458.5 filed Oct. 10, 2014, the entire disclosure of which is hereby incorporated herein by reference.

The invention relates to a race start assistance method for a boat participating in a regatta. It also relates to the device implementing the method.

BACKGROUND OF THE INVENTION

In a regatta race, boats must not cross the start line before the start signal, otherwise they have to turn round and cross the start line again.

The start line may be defined by the position coordinates of two points defining a virtual line.

In these regatta races, the aim is not only to cross the start line first while observing the start signal, but also at a speed closest to the maximum speed of the boat.

In a regatta race, the competitors have a pre-start, which takes place 5 minutes before the start signal, for manoeuvring in order to cross the start line in an optimal manner.

There is a known assist device for crossing the start line including a means for creating a virtual start line, a means for instantaneously knowing the position of the boat with respect to the virtual line, a means for knowing the instantaneous speed of the boat and calculation means for indicating distance with respect to the virtual start line and the time remaining until the start signal.

Using this knowledge of the remaining distance and remaining time, the boat must adjust its speed to cross the line, which leaves the skipper of the boat many choices and therefore uncertainties.

If the skipper has to manoeuvre the boat to adjust to this information, this will affect the start.

SUMMARY OF THE INVENTION

It is an object of the invention to provide a product and its method of operation which offers a simpler and more reliable way of managing the start of a regatta while remaining intuitive.

To this end, the invention relates to a race start assistance method for a boat participating in a regatta including a pre-race with a duration T before the crossing of the start line, the method including a first step intended to permit the creation and storage of the start line in virtual form, and the determination of the instantaneous speed of the boat and its position with respect to the start line, in order to provide at least one indication on how to proceed in the pre-race, the method being characterized in that:
  in a second step, prior to the race, at least one race start is simulated by performing a pre-race test, to measure and store, at least once, a parameter that is the maximum speed or test speed of the boat, to deduce therefrom a maximum distance that could be travelled during the pre-race duration if the boat moved at said test speed and thereby to determine the position of a line called the maximum distance line; and
  in a third step, after positioning the boat between the maximum distance line and the start line, a countdown period is started during which, on the one hand, the distance line moves towards the start line at the test speed while the boat also moves towards the race line at a lower speed than the maximum test speed and during which, on the other hand, the actual motion parameters of the boat are compared to the movement of the distance line to provide indications on the closeness of the distance line to the boat to enable the boat to adjust its speed and/or route so that when the distance line catches up with the boat, said boat is moving at the same speed as said distance line.

In a first advantageous embodiment, during the second step, the maximum speed is stored several times, and the maximum speed of the distance line is the mean of the stored maximum speeds.

In a second advantageous embodiment, the indications as to how to proceed are in digital form or in visual form.

The invention relates to a race start assistance device for a boat competing in a regatta, including a calculator, a satellite positioning means, a storage means, a means for entering information relating to a start line position in the calculator and/or the storage means,
this device being characterized in that it includes means for pre-determining a maximum test speed, means for calculating a separation distance corresponding to the calculated maximum speed multiplied by a time corresponding to the duration of a pre-race, means for simulating the movement of a distance line at the test speed, means for comparing the speed and the position of the boat with respect to the movement of the distance line, means for providing indications as to the difference in speed and/or the distance between the boat and the distance line and display means.

In a first advantageous embodiment, the device includes means for calculating the evolution of the speed of the boat so that its motion coincides with an optimised motion with respect to the start line to be crossed.

In a second advantageous embodiment, the device is integrated in a portable object, such as a mobile telephone or a tablet.

In a third advantageous embodiment, the device is integrated in a watch.

In a fourth advantageous embodiment, the display means are digital or visual.

In another advantageous embodiment, the display means include at least one hand moving with respect to a scale mark.

In another advantageous embodiment, the display means include indicator lights having a first colour, one indicator light having a second colour and indicator lights having a third colour, so that the indicator lights having a first colour are illuminated in the event of a lag position, the indicator lights having a third colour are illuminated in the event of an ahead position and the indicator light having a second colour is illuminated in the event of an optimum position.

In another advantageous embodiment, the watch crystal is touch-sensitive.

BRIEF DESCRIPTION OF THE DRAWINGS

The invention will be clearly understood with the aid of the following description given by way of non-limiting example with reference to the drawing in which.

DETAILED DESCRIPTION

Referring to the various Figures, a body of water for a boat regatta is illustrated.

Figure 1:
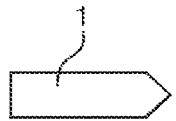
FIG. 1 shows a view of a body of water showing the start line and the boat.

FIG. 1 shows the start line 2, which can be determined from two geographical points A, B whose coordinates are, for example, data provided by geostationary satellites. A boat 1, which has to cross start line 2, is also illustrated.

The start of a regatta is an important moment. Indeed, the boats must cross the start line after the start signal and at the highest speed, because if the start line is crossed before the start signal, the competitor must turn round and then cross the line again in the right direction.

Further, if, to avoid crossing the line too soon, the competitor very suddenly drops his speed, he will require time to pick up speed again and will make a poor start.

A portable apparatus 100, using a race start assistance method for a boat participating in a regatta, is therefore used.

Figure 2:
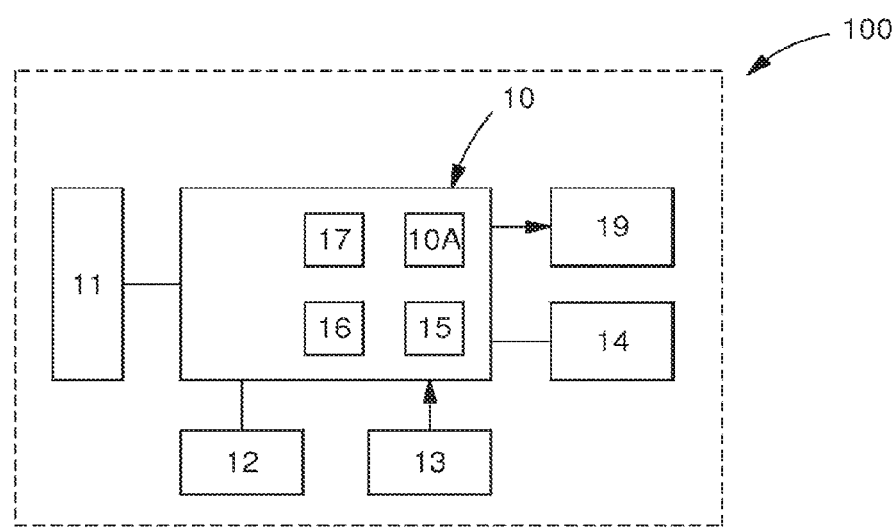
FIG. 2 shows a schematic view of an assistance device for regattas.

Portable apparatus 100, visible in FIG. 2, will include a calculator 10 for the overall control of the portable apparatus. Portable apparatus 100 further includes a satellite positioning means 11, a storage means 12 for data storage and a means 13 for entering information relating to a start line position in the calculator and/or the memory. This means 13 may be one or more buttons or touch-sensitive means.

These means will be supplemented by means 14 or pre-determining a maximum test speed associating, for example, a time base and the positioning device to determine a speed. However, it is also possible for the speed to be obtained from an external apparatus.

Calculator 10 which could be a microprocessor or microcontroller, will include means 10A for calculating a separation distance corresponding to the calculated maximum speed multiplied by a time T corresponding to the duration of a pre-race, means 15 for simulating the movement of a distance line at the test speed Vm, means 16 for comparing the speed and the position of the boat relative to the movement of distance line L and means 17 for providing indications as to the difference in speed and/or the distance between the boat and the distance line.

It also includes means for calculating the evolution of the speed of the boat so that its motion coincides with an optimised motion relative to the start line to be crossed, and display means 19.

During a first step visible in FIG. 1, the geographical points forming the start line are stored in said object. These geographical points can be entered manually or downloaded or stored by positioning oneself on a point on the start line using a GPS device and then pressing a button of the portable object to store the position. The operation is repeated to obtain the second point in order to delineate the start line.

This method then includes a second step or preparatory step having a duration T.

Figure 3A:
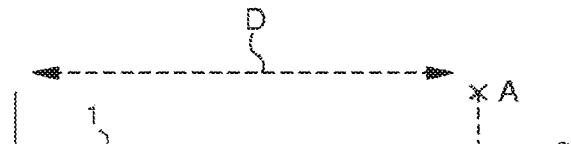
FIGS. 3A and 3B show views of a body of water showing the distance line at its maximum distance from the start line.

During this second step, which is shown in FIG. 3A, at least one race start is simulated in order to measure and store at least once a parameter which is the maximum speed Vm or "test speed" of the boat via speed determining means 14. This simulation takes the form of a pre-race test in real conditions. This speed information is used by means 10A to calculate a maximum separation distance D which could be travelled during pre-race duration T if the boat moved at said test speed, and thereby determine the position of a maximum distance line L. This distance D is stored by calculator 10 via storage means 12. The latter may be a flash memory.

In a third step or race start step, boat 1 is positioned between maximum distance line L and start line 2. A countdown with a duration T is then started.

Figure 4:
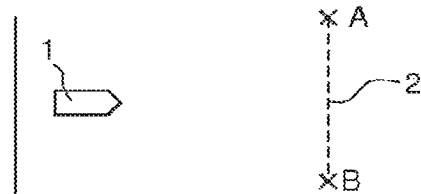
FIG. 4 shows a view of the body of water of FIG. 1, with the countdown started.
Figure 5:
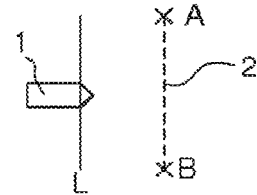
FIG. 5 shows a view of the body of water of FIG. 1, with the boat moving at the same speed as the distance line.

During this countdown, the calculator moves distance line L towards the start line at test speed Vm as seen in FIGS. 4 and 5.

Using the calculator, the position and/or actual motion parameters of boat 1 are then compared to the movement of distance line L. In fact, the boat may be stationary or moving slightly.

This calculator 10 thus provides indications on the closeness of distance line L to boat 1 to enable boat 1 to adjust its speed V and/or its route. This makes it possible, when the distance line catches up with boat 1, for said boat 1 to move at the same speed as that of said distance line.

Consequently, gradually over time, boat 1 will accelerate and distance line L will move closer to the boat. The difference in speeds will be limited, as will the distance between the distance line and boat 1. Parameters can therefore be calculated to allow the speed and/or the route of boat 1 to evolve so that its motion coincides with the movement of distance line L, obviously before crossing the start line 2.

It will be understood that the various measurements, such as that of the distance between boat 1 and start line 2, take into account the relative position of the boat. Indeed, depending on the wind direction, boat 1 may not always sail in a straight line.

Figure 3B:
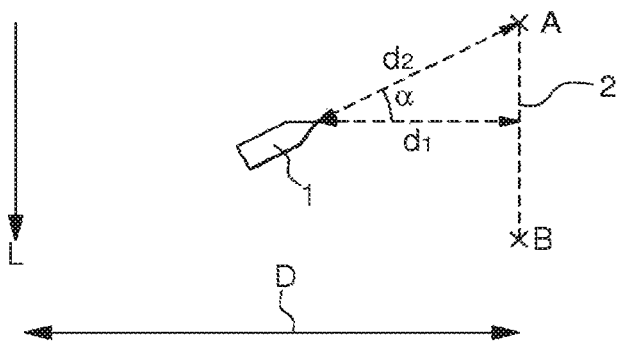

This fact implies the existence of an actual distance and a relative distance. The actual distance d1 is the shortest distance between boat 1 and start line 2, whereas the relative distance d2 is the distance between boat 1 and start line 2 taking into account the direction of the boat. Actual distance d1 passes through a line perpendicular to start line 2. Relative distance d2 is calculated by determining the angle $\alpha$ between the line perpendicular to start line 2 which is actual distance d1 and the straight line formed by the direction of the boat as seen in FIG. 3B, $d2 = d1/\cos\alpha$.

Consequently, calculator 10 is capable, depending on the position and direction of boat 1, of determining actual distance d1 and relative distance d2. It will be understood that, for the start of a regatta, actual distance d1 is the important distance, because boat 1 is capable of tacking, so the relative distance is unstable since it varies with angle $\alpha$ whereas the actual distance remains stable. The object is for the speed and the position of boat 1 to be such that the end of its travel during the pre-race coincides, as regards both the distance from start line 2 and speed, with the movement of distance line L which represents the optimised crossing of start line 2.

To achieve this, the device provides boat 1 with information, for example, the difference in speeds, the distance between distance line L and the position of boat 1 and predicted speed change instructions.

This information is provided by information means 20 and display means 19. Information means 20 may either take a digital form, i.e. numbers, or the form of visual indications, such as indicator lights 21 or hands 22 moving with respect to a scale mark.

Preferably, the information is presented in the form of visual indications. Indeed, these visual indications are easier to understand given that the boat driver has other tasks to attend to. For example, indicator lights may gradually be illuminated or colours may be used.

Where colours are used, one example may include a plurality of indicator lights in the form of segments. These indicator lights may be of different colours, the colours being associated with a particular piece of information.

Figure 6:
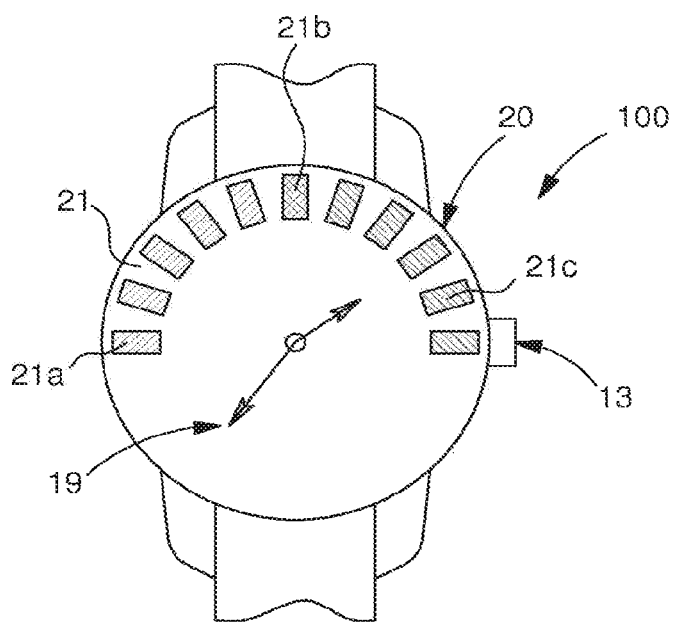
FIG. 6 shows a view of a watch fitted with the assistance device.

In an example of the invention shown in FIG. 6, the portable object is provided with 11 indicator lights. In detail, there will be 5 indicator lights having a first colour 21a, one indicator light having a second colour 21b and 5 indicator lights having a third colour 21c.

When the countdown is started, the 5 indicator lights having a first colour 21a are illuminated. The first colour may be red. When distance line L moves closer, some indicator lights will go out, so that the closer distance line L becomes, the lower will be the number of illuminated indicator lights 21a. At that moment, boat 1 accelerates.

When distance line L is level with boat 1 and the speed of distance line L is close to the speed of boat 1, the indicator light having a second colour 21 will light up. The second colour may be green. This means that boat 1 is in an optimum phase, i.e. it is at the right distance and right speed to cross start line 2 in an optimal manner.

If the indicator lights having a third colour 21c start to light up, this means that the boat is ahead of distance line L and that it must slow down. The third colour may be orange.

Thus, by means of a left-right apportionment it is possible to indicate whether boat 1 is ahead, in line with or behind its motion curve according to the illuminated colour. The skipper is capable of knowing whether he is ahead of (orange), behind (red) or within the required timing (green).

This also makes it possible to indicate whether the boat is significantly ahead or behind by means of the number of illuminated indicator lights 21.

Of course, it is possible to envisage the indicator lights taking the form of three bars each of a different colour. The bars indicating whether the boat is ahead or behind are then formed by a plurality of areas so that the further ahead or behind the boat is, the greater will be the number of illuminated areas.

These means are contained in a cover of a portable object, such as a telephone, a tablet or a watch case.

The speed of motion of boat 1 can be obtained by GPS type satellite positioning. Pressing on a watch button or on the telephone keyboard also makes it possible to store the maximum speed. It is also possible to obtain this speed using an external sensor.

Figure 7:
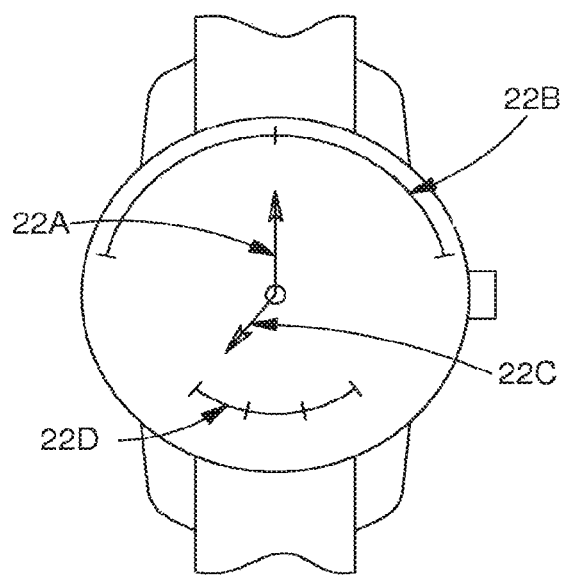
FIG. 7 shows a view of a variant embodiment of a watch fitted with the assistance device.

The device may therefore, as shown in FIG. 7, include a dial comprising a hand 22A which, in the 12 o'clock position indicates that the difference between the instantaneous speed and the distance line speed is equal to zero. If the hand moves towards the right on a scale 22B, this could mean that the instantaneous speed is greater than the distance line speed and therefore it is necessary to slow down, and if the hand moves towards the left that the instantaneous speed is insufficient. The amplitude of angular motion gives an idea of the significance of the difference, it is also possible to place the hand facing an explicit pictogram representing, for example, a − sign or a + sign.

A second hand 22C may, like the preceding hand, indicate the distance that separates the distance line from the boat on a scale 22D.

Instead of hands, there may be pie-shaped segments.

Given that the simulation occurs before the race, weather conditions can be taken into account by calculating the mean of various tests. This mean could be affected by a corrective measure depending on the wind speed measured at the time of the race. The maximum speed of the distance line may be the mean of several simulations.

It will be clear that various alterations and/or improvements and/or combinations evident to those skilled in the art may be made to the various embodiments of the invention set out above without departing from the scope of the invention defined by the annexed claims.

Storage means 12 could be a rewritable semiconductor mass memory utilising NOR or NAND technology.

Further, the present invention should not be limited to a portable product such as a telephone, a tablet or a watch case, but could also be a bracelet or a laptop computer.

What is claimed is:

1. A race start assistance method for a boat participating in a regatta including a pre-race having a duration before a crossing of the start line, the method comprising:
   creating and storing the start line in virtual form, and determining an instantaneous speed of the boat and a position thereof with respect to the start line, in order to provide at least one indication on how to proceed in the pre-race;
   simulating, prior to a race, at least one race start by performing a pre-race test, to measure and store, at least once, a parameter that is a maximum speed or test speed of the boat, to deduce therefrom a maximum distance that could be travelled during the pre-race duration when the boat is moved at said test speed and thereby to determine a position of a line called a maximum distance line;
   starting, after positioning the boat between the maximum distance line and the start line, a countdown period having a duration during which, the distance line moves towards the start line at the test speed while the boat also moves towards a race line at a lower speed than the maximum test speed and during which, actual motion parameters of the boat are compared to movement of the distance line to provide indications on a closeness of the distance line to the boat to enable the boat to adjust a speed and/or route thereof so that when the distance line catches up with the boat, said boat is moving at a same speed as said distance line; and
   adjusting the speed and/or route of the boat based on the indications on the closeness of the distance line to the boat.

2. The race start assistance method according to claim 1, wherein, during the simulating, storage of the maximum speed occurs several times, the maximum speed of the distance line being a mean of the stored maximum speeds.

3. The race start assistance method for a boat according to claim 1, wherein the indications on how to proceed are in digital form or in visual form.

4. A race start assistance device for a boat competing in a regatta, comprising:
   processing circuitry;
   a satellite positioning device;
   a storage; and
   a mechanism to enter information relating to a start line position in the processing circuitry and/or the storage, wherein
   the processing circuitry is configured to:
     pre-determine a maximum test speed,
     calculate a separation distance corresponding to the maximum test speed multiplied by a time corresponding to a duration of a pre-race,
     simulate movement of a line called a distance line at the maximum test speed,
     compare a speed and a position of the boat with respect to the movement of the distance line, and provide indications as to a difference in speed and/or a distance between the boat and the distance line to a display.

5. The race start assistance device for a boat competing in a regatta according to claim 4, wherein the processing circuitry is further configured to calculate an evolution of the speed of the boat so that a motion thereof coincides with an optimized motion with respect to the start line to be crossed.

6. The race start assistance device for a boat competing in a regatta according to claim 4, wherein the device is integrated in a portable object that is a mobile telephone or a tablet.

7. The race start assistance device for a boat competing in a regatta according to claim 5, wherein the device is integrated in a portable object that is as a mobile telephone or a tablet.

8. The race start assistance device for a boat competing in a regatta according to claim 4, wherein the device is integrated in a watch.

9. The race start assistance device for a boat competing in a regatta according to claim 5, wherein the device is integrated in a watch.

10. The race start assistance device for a boat competing in a regatta according to claim 4, wherein the display is digital or visual.

11. The race start assistance device for a boat competing in a regatta according to claim 6, wherein the display is digital or visual.

12. The race start assistance device for a boat competing in a regatta according to claim 7, wherein the display is digital or visual.

13. The race start assistance device for a boat competing in a regatta according to claim 8, wherein the display is digital or visual.

14. The race start assistance device for a boat competing in a regatta according to claim 9, wherein the display is digital or visual.

15. The race start assistance device for a boat competing in a regatta according to claim 10, wherein the display includes at least one hand moving on a scale mark.

16. The race start assistance device for a boat competing in a regatta according to claim 11, wherein the display includes at least one hand moving on a scale mark.

17. The race start assistance device for a boat competing in a regatta according to claim 12, wherein the display includes at least one hand moving on a scale mark.

18. The race start assistance device for a boat competing in a regatta according to claim 13, wherein the display includes at least one hand moving on a scale mark.

19. The race start assistance device for a boat competing in a regatta according to claim 14, wherein the display includes at least one hand moving on a scale mark.

20. The race start assistance device for a boat competing in a regatta according to claim 10, wherein the display includes indicator lights having a first color, one indicator light having a second color and indicator lights having a third color, so that the indicator lights having the first color are illuminated in an event of a lag position, the indicator lights having the third color are illuminated in an event of an ahead position and the indicator light having the second color is illuminated in an event of an optimal position.

21. The race start assistance device for a boat competing in a regatta according to claim 11, wherein the display includes indicator lights having a first color, one indicator light having a second color and indicator lights having a third color, so that the indicator lights having the first color are illuminated in an event of a lag position, the indicator lights having the third color are illuminated in an event of an ahead position and the indicator light having the second color is illuminated in an event of an optimal position.

22. The race start assistance device for a boat competing in a regatta according to claim 12, wherein the display includes indicator lights having a first color, one indicator light having a second color and indicator lights having a third color, so that the indicator lights having the first color are illuminated in an event of a lag position, the indicator lights having the third color are illuminated in an event of an ahead position and the indicator light having the second color is illuminated in an event of an optimal position.

23. The race start assistance device for a boat competing in a regatta according to claim 13, wherein the display includes indicator lights having a first color, one indicator light having a second color and indicator lights having a third color, so that the indicator lights having the first color are illuminated in an event of a lag position, the indicator lights having the third color are illuminated in an event of an ahead position and the indicator light having the second color is illuminated in an event of an optimal position.

24. The race start assistance device for a boat competing in a regatta according to claim 14, wherein the display includes indicator lights having a first color, one indicator light having a second color and indicator lights having a third color, so that the indicator lights having the first color are illuminated in an event of a lag position, the indicator lights having the third color are illuminated in an event of an ahead position and the indicator light having the second color is illuminated in an event of an optimal position.

25. The race start assistance device for a boat competing in a regatta according to claim 8, wherein a watch crystal of the watch is touch-sensitive.

26. The race start assistance device for a boat competing in a regatta according to claim 9, wherein a watch crystal of the watch is touch-sensitive.

* * * * *